(12) United States Patent
Skowronek et al.

(10) Patent No.: US 8,777,265 B2
(45) Date of Patent: Jul. 15, 2014

(54) STEERING DEVICE FOR MOTOR VEHICLES

(71) Applicant: Bayerische Motoren Werke Aktiengesellschaft, Munich (DE)

(72) Inventors: Alexander Skowronek, Feldkirchen-Westerham (DE); Helmar Liess, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/871,466

(22) Filed: Apr. 26, 2013

(65) Prior Publication Data

US 2013/0234425 A1  Sep. 12, 2013

Related U.S. Application Data

(63) Continuation of application No. PCT/EP2011/065948, filed on Sep. 14, 2011.

(30) Foreign Application Priority Data

Oct. 29, 2010  (DE) .......................... 10 2010 043 120

(51) Int. Cl.
  *B62D 1/16*  (2006.01)
  *B60R 16/027*  (2006.01)
(52) U.S. Cl.
  CPC ............... *B62D 1/16* (2013.01); *B60R 16/027* (2013.01)
  USPC .............. 280/775; 280/771; 74/493; 180/402
(58) Field of Classification Search
  CPC .................... B62D 1/16; B60R 16/027
  USPC ................... 280/771, 775, 779; 74/492, 493; 180/402, 403, 405, 406, 407; 439/15, 439/16
  See application file for complete search history.

(56) References Cited

U.S. PATENT DOCUMENTS 1,366,553 A * 1/1921 Blackburn ................. 200/61.55
1,922,493 A * 8/1933 Murray ....................... 200/61.55
(Continued)

FOREIGN PATENT DOCUMENTS

DE     1 698 768 U    5/1955
DE    197 56 057 A1   7/1999
(Continued)

OTHER PUBLICATIONS

Official Translation of JP 50-041232, translated Aug. 2013.*
(Continued)

*Primary Examiner* — Drew Brown
(74) *Attorney, Agent, or Firm* — Crowell & Moring LLP (57) ABSTRACT

A steering device for a motor vehicle has a steering wheel which is connected in a rotationally fixed fashion to a steering shaft which is continuously hollow and through which at least an electrical conductor is led in order to make electrical connection with steering-wheel-side equipment. The conductor, in particular flexible conductor tracks, highly flexible cables, and/or flat conductor ribbons, is guided in an axial direction through the entire steering shaft, and emerges therefrom at the two ends of the steering shaft, and is surrounded essentially by a protective device. The protective device has two protective tubes which can be changed in length in the axial direction, in particular by moving them in and out in a telescopic fashion.

20 Claims, 4 Drawing Sheets

(56) References Cited

U.S. PATENT DOCUMENTS

| | | | | |
|---|---|---|---|---|
| 4,383,148 | A | * | 5/1983 | Arima et al. ............... 200/61.54 |
| 4,943,182 | A | * | 7/1990 | Hoblingre ................... 403/349 |
| 6,913,107 | B2 | * | 7/2005 | Sato et al. .................... 180/402 |
| 8,162,095 | B2 | | 4/2012 | Bootz et al. |

FOREIGN PATENT DOCUMENTS

| | | |
|---|---|---|
| DE | 199 24 752 A1 | 11/1999 |
| DE | 199 00 083 A1 | 7/2000 |
| DE | 698 23 255 T2 | 4/2005 |
| DE | 10 2005 016 676 A1 | 10/2006 |
| DE | 10 2008 021 973 A1 | 11/2009 |
| DE | 10 2009 023 527 A1 | 12/2010 |
| EP | 1 713 096 B1 | 7/2007 |
| JP | 50-41232 A | 4/1975 |
| WO | WO 2009132744 A1 * | 11/2009 |

OTHER PUBLICATIONS

Machine Translation of DE19900083, printed Aug. 2013.*
Machine Translation of DE102008021973, printed Aug. 2013.*
International Search Report dated Nov. 30, 2011 with English translation (six (6) pages).
German Search Report dated Nov. 23, 2011 with partial English translation (ten (10) pages).

\* cited by examiner

STEERING DEVICE FOR MOTOR VEHICLES

CROSS REFERENCE TO RELATED APPLICATIONS

This application is a continuation of PCT International Application No. PCT/PCT/EP2011/065948, filed Sep. 14, 2011, which claims priority under 35 U.S.C. §119 from German Patent Application No. 10 2010 043 120.6, filed Oct. 29, 2010, the entire disclosures of which are herein expressly incorporated by reference.

BACKGROUND AND SUMMARY OF THE INVENTION

The invention relates to a steering device for a motor vehicle having a steering wheel, which is connected in a rotationally rigid manner to a steering shaft, which is hollow from end to end and through which at least one electrical conductor is guided in order to make an electrical connection with control units on the steering wheel side.

In particular, it relates to a steering device of the flexible steering concept (FSC design type) without any mechanical drive connection between the steering wheel and a steering gearbox. The steering device also has a hydraulic default level, which includes a hydraulic feed unit, coupled to the steering wheel, and a hydraulic actuating unit, which is coupled to the steering gearbox. In the event of a malfunction, the hydraulic actuating unit can also be used to produce a wheel steering angle by an input from the steering wheel.

With respect to the relevant prior art, in particular relating to the FSC design type, reference is made to DE 10 2008 021 973 A1. A steering device as described above is disclosed in German utility model no. 1 698 768.

The so-called FSC systems, in which the steering request input by the driver of a vehicle at the steering wheel or the like (instead of a steering wheel, a so-called side stick or the like can also be provided as the so-called steering control element, and for the sake of simplicity only one steering wheel is discussed below) is not transmitted to the steerable wheels of the vehicle by the direct mechanical route (that is, as in the case of the aforementioned DE 1 698 768 and in conventional modern vehicles) and by way of the so-called steering column or the steering shaft as well as a steering gearbox coupled thereto (for example, a rack and pinion steering gearbox), but rather by an electric or hydraulic route, are advantageous with respect to the configuration possibilities for the system components in the vehicle. Since, however, an actuator, which is actuated by signals of the steering wheel input and, as a result, pivots the steerable wheels, can fail, these systems provide a so-called default level, which in view of a desired installation flexibility is usually configured hydraulically and can include such features as a hydraulic feed unit, which is coupled to the steering wheel, and a hydraulic actuating unit, which is coupled to the steering gearbox, as well as a hydraulic circuit, which hydraulically connects together these two units.

Furthermore, an FSC system has to have a so-called steering torque simulator, with the aid of which a torque, directed opposite to the steering torque generated by the driver, can be applied to the steering wheel. This is done in order to give the driver a typical steering feeling and, thus, a quasi-tactile contact with the road lane. In particular, an end stop is also provided for the rotational movement of the steering wheel that corresponds to the maximum steering angle of the steerable vehicle wheels. This end stop is typically represented by the steering torque simulator, in that an electric motor, which forms this steering wheel simulator, applies such a high counter-torque to the steering torque, generated by the driver, that the driver cannot turn the steering wheel any further.

The pertinent prior art also includes flexible conductor tracks, highly flexible cables and flat conductor ribbon cables, which have proven to be reliable as flexible transmission systems for electric current between movable elements having electrical connections. The disclosures of DE 10 2005 016 676 A1 and EP 1 713 096 B1, both of which describe such conductors, are incorporated herein by reference to the extent required for the invention with respect to the pertinent prior art.

Due to the operating elements and safety devices, such as an airbag, placed directly at the steering wheel, it is necessary to transmit information and power electrically from the stationary vehicle parts into the rotatable steering wheel and back. Such a transmission has to be possible while at the same time it must also be possible to rotate the steering wheel out of its central position, in order to turn the wheel as far as to the predetermined steering stops, by way of multiple revolutions in each direction. At the same time, the function of smooth action, low noise and at low cost over the entire lifetime of the motor vehicle has to be ensured and, in particular, at least for one electrical line, but typically for a large number of electrical lines, having a cross section for current strength of up to 8 amperes. For example, it may be easily necessary to run 16 electrical lines into the steering wheel. Moreover, most vehicles have an adjustable steering wheel with height and length adjustment, where the length adjustment changes the distance to the driver. To this end, the steering column may be designed in such a way that it can be telescoped. In addition, the aim is to minimize the necessary installation space and to simplify the assembly process and still maintain a reliable, fast installation into and removal from the motor vehicle.

The aforesaid necessitates the object of the present invention, which is to provide a steering device and a method for making an electrical connection with the equipment on the steering wheel side, so that both the steering device and the method can meet, based on the aforementioned prior art, the above described requirements.

According to the invention, a steering device for a motor vehicle with a steering wheel, which is connected in a rotationally rigid manner to a steering shaft, which is hollow from end-to-end and through which at least one electrical conductor is guided, in order to make an electrical connection with the equipment on the steering wheel side, is characterized by the fact that the conductor, in particular a flexible conductor track, highly flexible cables, and/or flat conductor ribbon cables, is guided in an axial direction through the entire steering shaft and emerges from the steering shaft at both ends of the steering shaft and is surrounded in essence by a protective device, in particular, by two protective tubes, the length of which can be changed in the axial direction, in particular, by moving the protective tubes in and out in a telescopic manner.

This approach has the advantage that when the amount of installation space required is extremely small in the radial direction, the electrical connection can be designed adequately long, a feature that prevents the electrical connection from failing because of the voltage load on the conductors owing to the rotation of the steering wheel, where such a voltage load is generated over the customary useful life of a motor vehicle. The longer the conductors can be chosen, the more this load (because of the rotatability of the steering wheel by three to five revolutions) decreases for the conductors that run centrally in the steering shaft. Due to the length and the shape of the conductors and the longitudinally adjustable protective device, a telescopic adjustment of the steering column can also take place. In addition, the conductors are housed in the hollow steering shaft in such a way that they are protected and, at the same time, use space in the steering shaft that is not needed for other usages. In comparison to a conventional coil spring cartridge, costs and installation space are saved; and also the design freedom in the upper steering wheel region is increased.

A preferred embodiment of the invention provides that the protective device includes two tubes, an outer and an inner tube, which can be slid inside one another in the manner of a telescope with their adjacent end. This arrangement has the advantage that the longitudinally adjustable protective device is simple in design and easy to manufacture, for example, of a synthetic plastic material. If then the tubes of the protective device can be secured to one another in the axial and in the circumferential direction, in particular, in the axially totally extended position, it is possible in a simple way to implement without additional parts the transport securing mechanism that prevents the two tubes from turning in relation to each other, for example, in the central position for driving straight ahead, in a pre-assembled unit. Such a pre-assembled unit can include at least one end module, an additional end module, the conductor with the electrical connectors and the protective device, connecting the end modules, where the protective device consists of two tubes, which can be slid inside one another in the manner of a telescope in the axial direction and are secured to one another by anti-rotation and anti-displacement securing devices. Due to the anti-displacement securing device in the as-delivered state, it is possible to avoid an uncontrolled turning of the spiral cable with the conductors, thus eliminating the possibility of damaging the cable before and after installation. The tubes of the protective device can be secured to one another in a friction locking and/or positive locking manner, for example, by use of a bayonet lock or by way of a serration in the circumferential direction, combined with at least one snap cam, in particular a latching collar, in the axial direction. If the friction locking and/or positive locking connection of the tubes of the protective device can be released by hand at least from one end of a tube on the steering wheel side, this arrangement has the advantage that the assembly or disassembly of the central cable unit in the steering column is very simple and also easy to repeat because of the locking possibility.

Advantageous embodiments of the invention are characterized by the fact that on the end of the protective device that faces away from the steering wheel, the conductor is held, in particular, fixed in the axial and radial direction, by way of an end module, which does not turn with the steering shaft; and on the end of the protective device that faces the steering wheel, the conductor is held, in particular, fixed in the axial and radial direction, by an additional end module that turns with the steering shaft. As a result, the twistable length of the conductor can be chosen longer than the length of the steering shaft, in that the length of the conductor between the two end modules is greater than their distance from one another. This feature can be achieved in that the conductor is constructed in the axial direction at least inside the shaft in the form of a spiral, in a corrugated manner, in the form of an accordion, in the form of a helix, in the form of a ribbon, and/or as a single cable. The conductor can be fixed in a simple way in its position in the closed protective housing by way of the end modules. At the same time, in order to connect the conductor to its corresponding terminals at the steering wheel and on the vehicle side, it is advantageous to attach the cable connectors to the ends of the conductor. These cable connectors can be plug-in connectors. In order to insert the plug-in connectors with the conductors into the steering shaft, all of them have to fit through the steering shaft or, more specifically, through the protective device. If, at the same time, the size of the plug-in connectors is as large as possible, then the requirement can be satisfied best if the conductors are provided with a large number of electrical plug-in connectors that are axially offset along the conductors such that they lie individually one after the other. Furthermore, a plurality of conductors can be accommodated on a conductor carrier in such a way that they are electrically insulated from one another. This conductor carrier can be designed, for example, as flexible conductor tracks, highly flexible cables and/or as a flat conductor ribbon cable. It is also possible to accommodate a plurality of such conductor carriers with electrically insulated conductors, for example, lying one above the other, together at least in the steering shaft. In this case it is advantageous if one or both end modules fix the conductor or, more specifically, the conductor carriers at least in the axial direction, in particular, however, also in the radial direction.

For a steering device that is characterized by the fact that it does not have a mechanical drive connection between the steering wheel and a steering gearbox, especially if the steering gearbox is driven by an actuator that is acted upon with the output signals from the steering wheel actuation, such an arrangement of at least one conductor in the steering shaft is especially advantageous. It is also possible to implement an electrically controlled steering of a flexible steering concept, FSC, in a simple and cost saving way, in that the steering gearbox is coupled to a hydraulic actuating unit, which is acted upon by a hydraulic feed unit that is controlled by the steering wheel, and forms in the event of a malfunction of the actuator a default level for controlling the steering by way of a hydraulic connection between the hydraulic feed unit and the hydraulic actuating unit that can be switched into the hydraulic circuit.

It is advantageous for a simple and reliable installation if those embodiments of the steering device, in which a unit can be pre-assembled, include, furthermore, at least one end module, an additional end module, a protective device and conductors, in particular, also with plug-in connectors. Then, such a unit can be easily moved from the pre-assembled state into the assembled state in the motor vehicle, if the unit has the anti-torsion securing device, which fixes the position of the end module to the additional end module at least in the torsional direction and, in particular, in essence in a central position, based on a torsion capability of the conductor in both directions, a straight ahead driving position of the steering wheel. This central position ensures that in any case the conductor can be turned in both directions with the steering wheel as far as up to its stop. The two tubes can be fixed in relation to each other in the circumferential direction in an advantageous manner.

For the installation of the pre-assembled unit on the vehicle side and for the installation of the steering wheel it is advantageous if the electrical plug connections are made automatically during the mounting process. In that regard, on the vehicle side or, more specifically, the steering wheel side the plug-in connectors make the connection from the conductor to the terminals in the vehicle or, more specifically, in the steering wheel. In particular, this is done in the course of bringing the pre-assembled unit into the steering wheel, when the end module is attached permanently to the vehicle and in the course of mounting the steering wheel, when the additional end module is connected in a rotationally rigid manner to the steering shaft.

According to the invention, there is also provided a method for making an electrical connection with the equipment on the steering wheel side in a steering device of a motor vehicle, with a steering shaft, which is hollow from end to end and through which at least one electrical conductor is guided, in particular a flexible conductor track, highly flexible cables and/or flat conductor ribbon cables, in a pre-assembled unit comprising at least one end module, an additional end module, the conductor with electrical connectors and a protective device. The protective device connects the end modules and consists of two tubes, which can be slid inside one another in the manner of a telescope in the axial direction and are secured to one another by an anti-rotation and anti-displacement securing device. The method includes at least the following assembly steps:

(a) inserting the pre-assembled unit with tubes, which are secured to one another, in the axial direction into the hollow steering shaft until the end module is placed in such a way that it is permanently attached to the vehicle by a positive lock;

(b) releasing the anti-rotation and anti-displacement securing device between the two tubes of the protective device;

(c) sliding in a telescopic manner the protective device as far as the stop on the steering wheel bottom and securing the additional end module in such a way that it is fixed on the steering wheel; and (d) electrical contacting of the electrical connectors with their corresponding terminals.

Particular embodiments of the method may include, as described above, advantageously individual features of the subject matter of the invention. One particularly advantageous method is characterized, for example, by the fact that the electrical connectors are secured on the vehicle in such a way that they are aligned with the corresponding electrical connectors on the end module of the pre-assembled unit, so that their electrical connection is made automatically at the same time that the positive lock on the end module is produced when the pre-assembled unit is inserted into the hollow steering shaft.

Other objects, advantages and novel features of the present invention will become apparent from the following detailed description of one or more preferred embodiments when considered in conjunction with the accompanying drawings.

DETAILED DESCRIPTION OF THE DRAWINGS

In the drawing figures, identical elements are marked with the same reference numbers. Further, the two embodiments are not drawn to the same scales and, illustrate cut away sections to a certain extent.

Figure 1:
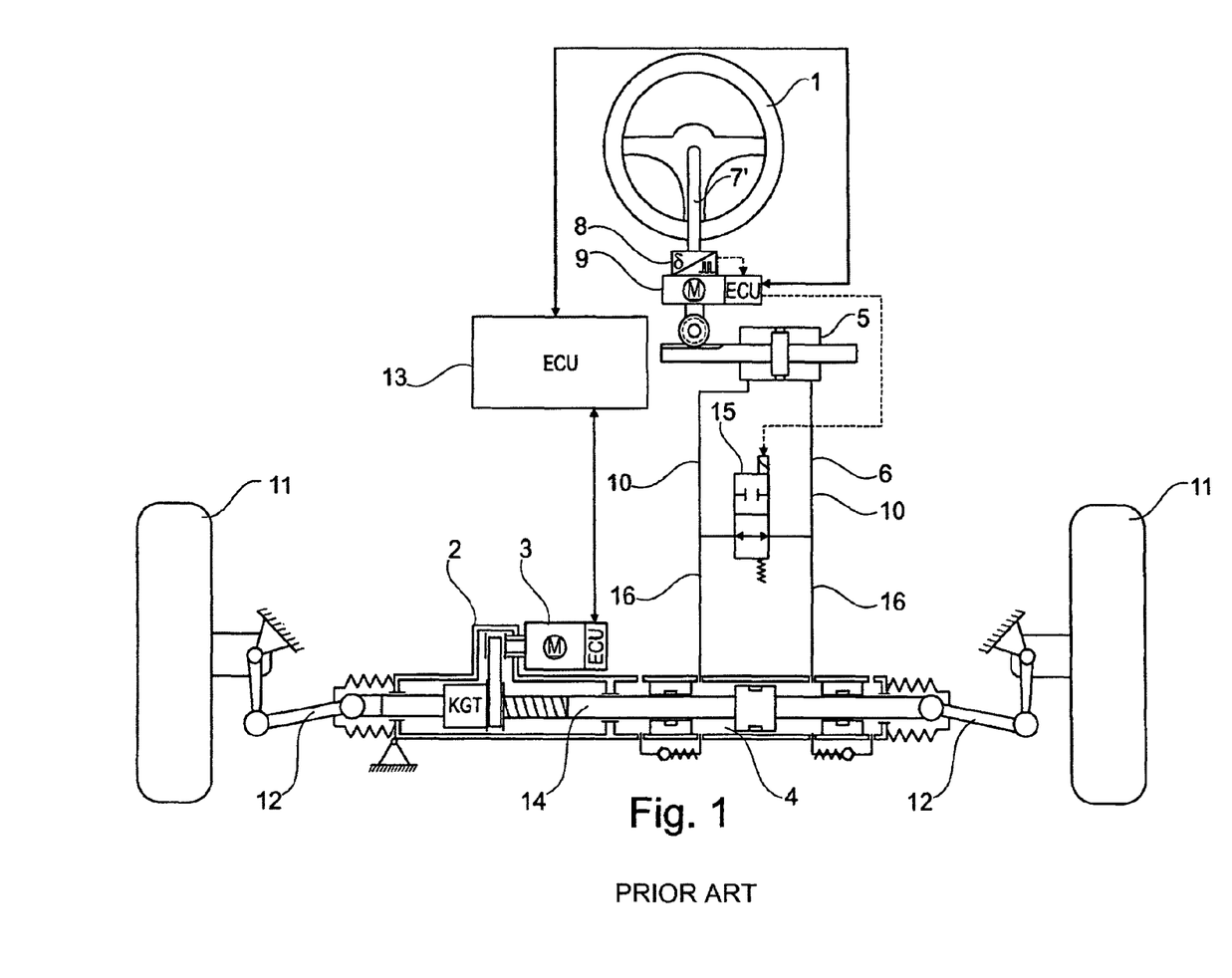
FIG. 1 is a schematic diagram illustrating a steering system according to the flexible steering concept (FSC) showing a steering shaft according to the prior art.

Steering according to FSC (flexible steering concept), which is known from the prior art according to FIG. 1, allows for steering without any mechanical drive connection between a steering wheel 1 and a steering gearbox 2. The gearbox 2 is driven by an actuator 3 that is actuated by output signals from the steering wheel actuation. This steering gearbox 2 is coupled to a hydraulic actuating unit 4, which is acted upon by a hydraulic feed unit 5 that is controlled by the steering wheel 1, and forms in the event of a malfunction of the actuator 3, a default level for controlling the steering by way of a hydraulic connection between the hydraulic feed unit 5 and the hydraulic actuating unit 4 that can be switched into the hydraulic circuit 6.

The steering wheel 1, which is to be operated by a driver of a vehicle, is connected in a rotationally rigid manner to a steering shaft 7'. This steering shaft 7' is equipped with a rotational angle sensor 8, with which the steering angle input by the driver via the steering wheel 1 can be sensed. Furthermore, a steering torque simulator 9, which acts on the steering shaft 7', is designed as an electric motor. Finally, the end of the steering shaft 7' opposite the steering wheel 1 has a hydraulic feed unit 5 in the form of a synchronous piston-cylinder unit. This hydraulic feed unit feeds, upon a rotational movement of the steering wheel 1 and, as a function of the direction of rotation, a hydraulic fluid in a steering wheel-sided part 10 of the hydraulic circuit 6 to the one or the other side, that is, into one of the two hydraulic lines marked with the reference numeral 10.

The two steerable wheels 11 of the two-track vehicle can be pivoted and, hence, steered in a manner that is known in principle from the prior art by way of steering arms and tie rods 12. These tie rods 12 are hinged to a piston rod 14 of a steering gearbox 2. In this case the piston rod 14 can be shifted transversely to the longitudinal direction of the vehicle. This steering gearbox 2 is actuated, or rather acted upon, by the electric motor powered actuator 3 in such a way that the desired pivot movement of the steerable wheels 11 is initiated. In this context the actuator 3, more specifically an electric motor thereof, is actuated by an electronic control unit 13, via the signals of the rotational angle sensor 8, which is connected to the steering wheel 1 and which reflects the steering input of the driver. In so doing, the electronic control unit 13 controls the position of the piston rod 14 of the steering gearbox 2.

In the event that the electric motor powered actuator 3 and, in particular, the electric motor of the same should fail, the vehicle must still remain steerable. For this reason there is a so-called default level, which is formed, inter alia, by the aforementioned steering wheel-sided part 10 of a hydraulic circuit 6, as well as a steering gearbox-sided part 16 of the hydraulic circuit 6. This steering gearbox-sided part 16 of the hydraulic circuit can be suitably connected to a fail-safe valve 15 by way of the same and, in turn, acts on the hydraulic actuating unit 4, which is formed by the steering gearbox 2 itself. The steering gearbox-sided part 16 of the hydraulic circuit 6 can act on the steering gearbox 2 by way of the hydraulic actuating unit 4 in such a way that when the steering wheel-sided part 10 is connected to the steering gearbox-sided part 16 of the hydraulic circuit 6, the steerable wheels 11 are steered according to the steering input at the steering wheel 1. In the sense of a generation or actuation of the default level, the two parts 10, 16 of the hydraulic circuit 6 can be suitably connected to each other by way of the fail-safe valve 15. In this context, the fail-safe valve 15 is designed in such a way that in the de-energized state it makes the connection between the two parts 10, 16 of the hydraulic circuit 6 and, thus, a hydraulic connection between the hydraulic feed unit 5 and the hydraulic actuating unit 4.

Figures 2, 3:
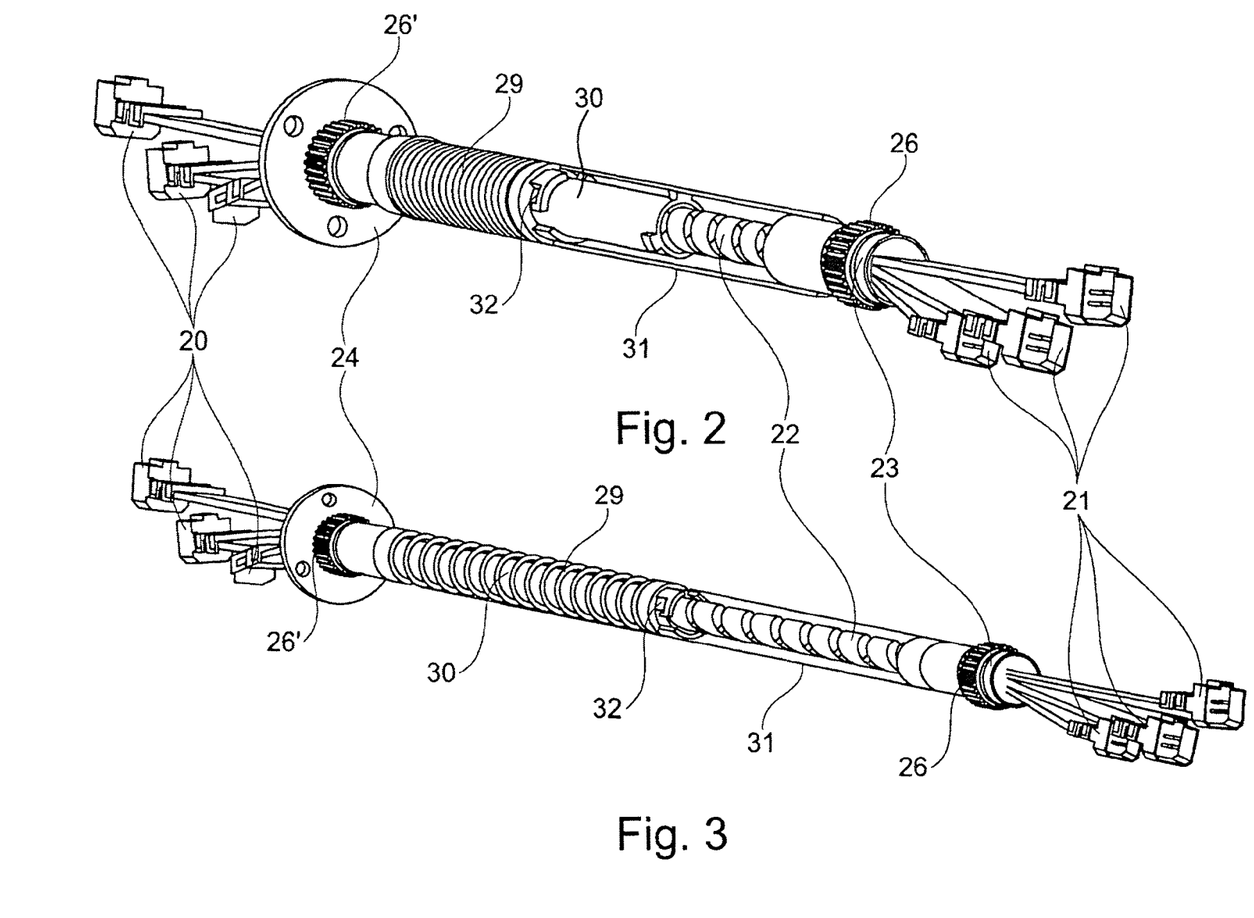
FIG. 2 is a first embodiment of a central cable unit for an interior of a hollow steering shaft of a steering device according to the invention.
FIG. 3 is an illustration of the first embodiment of FIG. 2 in a transport condition.

In particular, such a steering device as shown in FIG. 1 can have an inventive steering shaft that is hollow all the way through. In the center of the steering shaft there is, according to the invention, a central cable unit that is installed or, more specifically, runs, according to FIGS. 2 to 7, in the center. For example, six signal lines for actuating the steering wheel airbags, six signal lines for additional equipment on the steering wheel side and two lines for heating the steering wheel run through the steering shaft. For each of these three groups of connections there is an electric plug-in connector 20, 21 in order to make the electrical connection on each side of the steering shaft (the steering shaft is not shown in FIGS. 2 to 7). In that regard, the steering shaft would surround the depicted central cable units shown in FIGS. 2 to 7. On the end of the steering shaft that faces away from the steering wheel, the lines 22 extend through an end module 23, which does not rotate with the steering shaft; and on the end of the steering shaft that faces the steering wheel, the lines extend through an additional end module 24, which does rotate with the steering shaft. Moreover, these lines 22 are fixed in the end modules 23, 24 in the axial and radial directions (FIGS. 2 and 3). The three plug-in connectors 21 on the end of the lines 22 that faces away from the steering wheel are designed such that they can be pushed into the steering shaft on the end facing the steering wheel. To this end, these three plug-in connectors 21 are axially offset along the lines 22 in such a way that they lie one after the other and pass with the lines 22 through the steering shaft.

Figure 4:
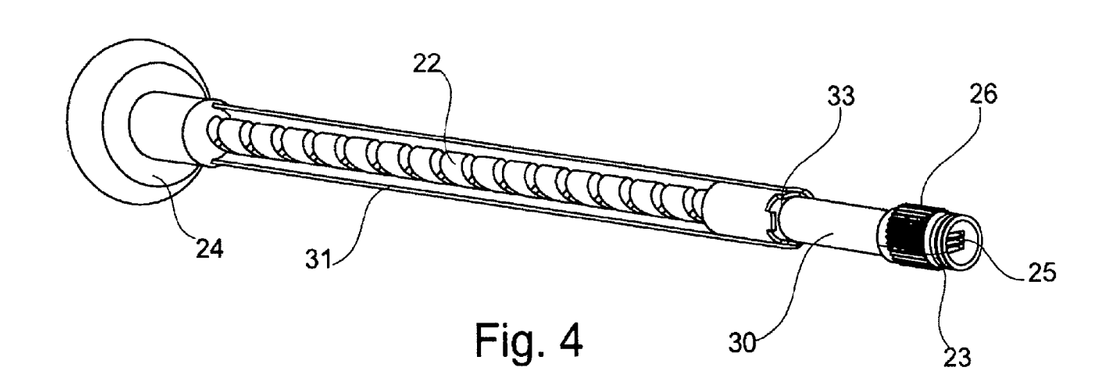
FIG. 4 is a second embodiment according to the invention shown in a transport condition.
Figure 5:
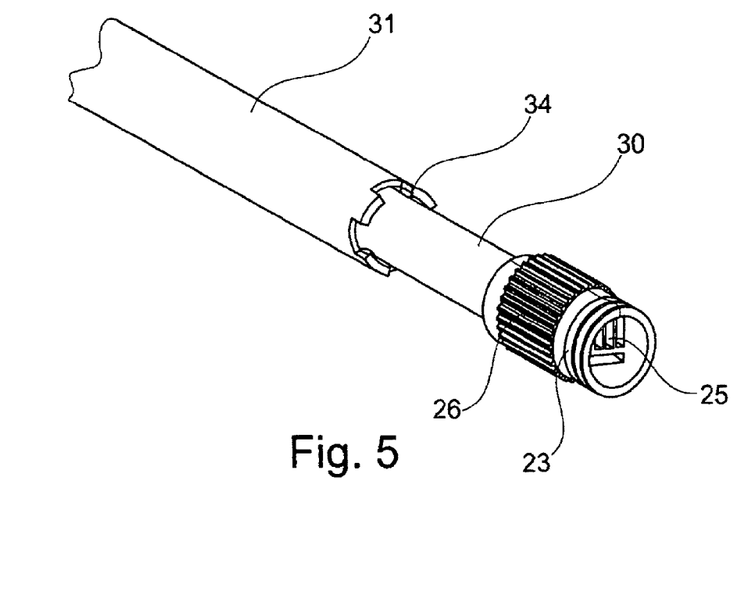
FIGS. 5-7 are exploded views of FIG. 4 in an installed condition.
Figures 6, 7:
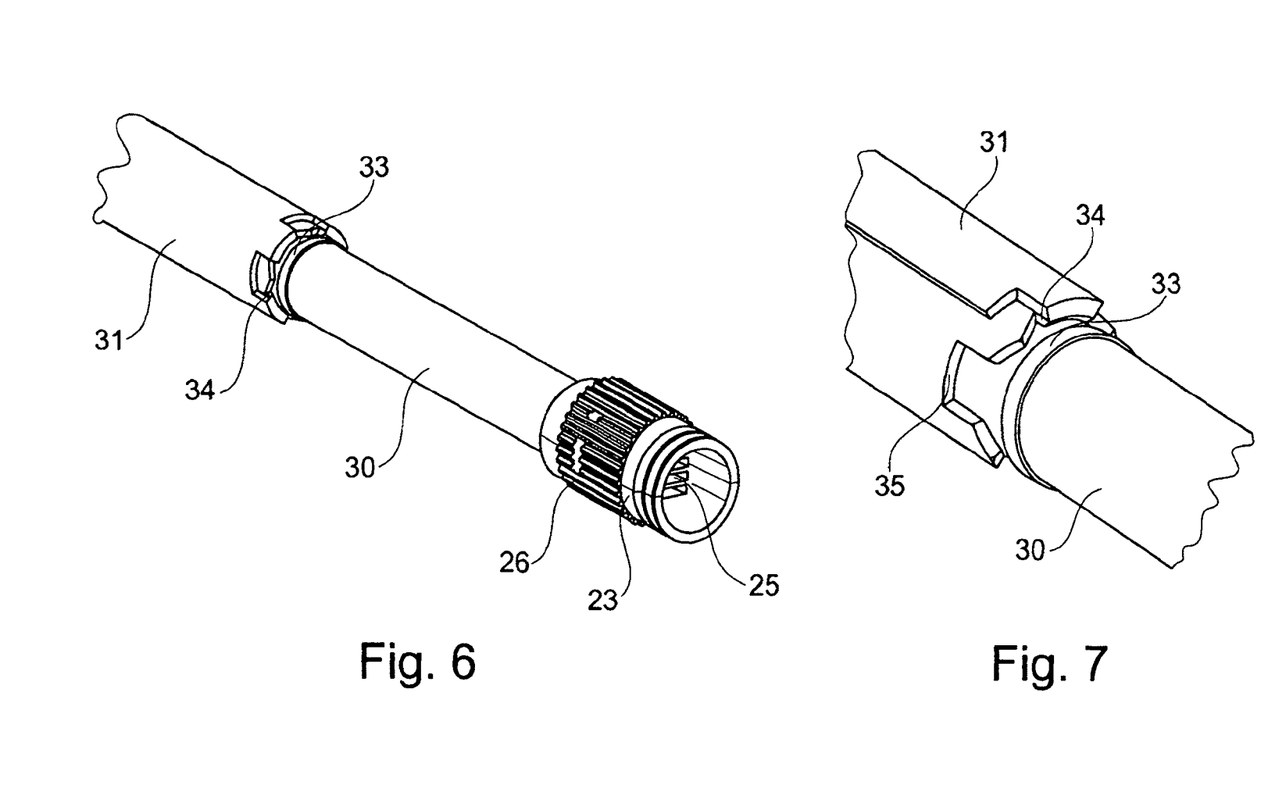

The lines 22 can also be fixed in the axial and radial direction in the end module 23 by way of their plug-in connector 25 in such a way that the electrical connection is automatically made when the central cable unit is inserted into the steering shaft (FIGS. 4 to 6).

In a method for making an electrical connection with the steering wheel-sided electrical equipment in a steering device of a motor vehicle with a steering shaft, which is hollow from end to end and through which a pre-assembled unit with flat conductor ribbon cables 22 is guided, and additionally also has at least one end module 23, an additional end module 24, the electrical connectors and a protective device, which connects the end modules 23, 24 and consists of two tubes 30, 31, which can be slid inside one another in the manner of a telescope in the axial direction and are secured to one another by an anti-rotation and anti-displacement securing device, then the following assembly steps can be applied one after the other:

(a) inserting the pre-assembled unit with tubes 30, 31, which are secured to one another, in the axial direction into the hollow steering shaft until the end module 23 is placed in such a way that it is permanently attached to the vehicle by a positive lock;

(b) releasing by hand the anti-rotation and anti-displacement securing device between the two tubes 30, 31 of the protective device from the direction of the steering wheel-sided end of the tube 31 by unlocking a bayonet lock 32 (FIGS. 2, 3) or by pushing over a snap cam 33 on the tube 30 with a latching nose 34 on the tube 31 (FIGS. 4 to 7);

(c) sliding in a telescopic manner the tubes 30, 31 of the protective device as far as the stop on the steering wheel bottom and securing the additional end module 24 in such a way that it is fixed on the steering wheel; and (d) electrical contacting of the electrical connectors 20, 21 with their corresponding terminals.

As an alternative, the electrical connectors on the vehicle can be secured in such a way that they align with the corresponding electrical connectors 25 on the end module 23 of the pre-assembled unit, so that their electrical connection is made automatically at the same time that the positive lock on the end module 23 is produced when the pre-assembled unit is inserted into the hollow steering shaft. When this positive lock is produced, one serration 26 or 26' each meshes with a corresponding opposite serration on the vehicle side or on the steering wheel side as the radial anti-rotation securing device on the end module 23 or on the additional end module 24 during the assembly process of the central cable unit. The lines 22 are surrounded in each case by a tube 30, which is securely connected to the end module 23 or by an additional tube 31, which is securely connected to the additional end module 24. During the assembly process these two tubes are pushed from the direction of the steering wheel side into the steering shaft as a component of the central cable unit. Therefore, the electrical connector 25, which is fastened on the end of the conductor that faces away from the steering wheel, can be designed in such a way and/or can be held in a fixed manner at least in the axial direction in the end module 23, that an electrical connection is automatically made with a corresponding electrical connector on the vehicle during the assembly of the end module 23. Such a connection can also be made by way of an auto-sensing direct plug-in mechanism. The result is a simplification of the assembly and disassembly process and, hence, also an improvement in the ease of service.

In addition to the flat conductor ribbon cables 22, which are shown in the figures, where a plurality of conductors are accommodated on a conductor carrier in such a way that they are electrically insulated from one another, suitable signal lines may also include flexible conductor tracks (not illustrated) and/or highly flexible cables. In this case a plurality of conductors can be accommodated on a conductor carrier in such a way that they are electrically insulated from one another; and also a plurality of conductor carriers with electrically insulated conductors can be accommodated together in the steering shaft. These conductor carriers are guided in the axial direction through the entire steering shaft and can emerge from this steering shaft at both ends of the steering shaft. Since the lines 22 are fixed in the end modules 23, 24, in particular, by way of their plug-in connectors 25; and, of these one is attached permanently to the vehicle and one is attached permanently to the steering wheel, and, hence the steering wheel 1 is twisted or rather deflected when the lines 22 are rotated, these lines are chosen to be longer, so that the length of the lines 22 between the two end modules 23, 24 is longer than their distance from one another. Inside the steering shaft, in the axial direction, the lines can be designed then as flexible conductor tracks, highly flexible cables and/or flat conductor ribbon cables 22 in the form of a spiral (FIGS. 2 to 7) and/or, as not illustrated, in a corrugated manner, in the form of an accordion, in the form of a helix, in the form of a ribbon and/or as a single cable.

FIGS. 2 to 4 show units that are constructed in a pre-assemblable manner for a steering device for a motor vehicle with a steering wheel (not illustrated) that is connected in a rotationally rigid manner to a steering shaft (not illustrated), which is hollow from end to end and through which the electrical lines are guided as flat conductor ribbon cables 22, in order to make a connection with the equipment on the steering wheel side. In this case the flat conductor ribbon cables 22 emerge from the steering shaft at both ends of the steering shaft by way of the end modules 23, 24 and are surrounded more or less by a protective device. This protective device consists of the two protective tubes 30, 31, the length of which can be changed in the axial direction by moving the two tubes 30, 31 in and out in a telescopic manner. These tubes are mounted in such a way that they can be moved inside one another with their adjacent end. These tubes can be secured to one another in a positive locking manner in the axial direction and in the circumferential direction and, in particular, in the axially totally extended position. To this end, FIGS. 2 and 3 show the bayonet lock 32 as an anti-rotation securing device, which secures in essence the position of the tubes 30, 31 with respect to each other and, thus, the position of the end module 23 to the additional end module 24 totally extended in the axial direction and in the rotational direction more or less in a central position.

As shown in FIG. 3, the locking of the bayonet lock 32 in a transport position, is totally extended in the axial direction in the manner of a telescope, secured by way of a compression spring 29, which maintains the positive lock of the bayonet lock 32, by clamping the two tubes 30, 31 relative to each other. In FIG. 2, which shows an installation position of the central cable unit, the bayonet lock 32 is unlocked, and the compression spring 29 is compressed even more due to the installation into the steering shaft. As a result, the pressure force of the compression spring 29 in the axial direction secures the position of the end module 23 on the vehicle side. The serration 26 of the end module 23 is held by the spring force in the counter-serration (not shown) on the vehicle side. At the same time it is possible to still support the possibility of adjusting the length of the steering shaft, which is not illustrated, by adapting the central cable unit to the steering shaft by moving the tubes 30, 31 in or out in the manner of a telescope.

Similarly, the circumferential grooves 35, which are axially directed in the embodiment according to FIGS. 4 to 7 and which may be found on the tube 30, and/or a snap cam 33 on the tube 30, designed as a latching collar, interacting with a latching nose 34 on the tube 31, serve to secure the tubes 30, 31 of the protective device in the circumferential direction or in the axial direction, with respect to the circumferential direction, also in a central position, a straight ahead driving position of the steering wheel, based on the capacity of the flat conductor ribbon cables 22 to twist to the left or to the right. This arrangement guarantees the installation of the lines 22 in a defined central position, from which the steering wheel can be turned to any side as far as up to the steering stop without adversely affecting the function of the lines 22 over the lifetime of the motor vehicle. In addition, owing to this anti-rotation securing device in the as-delivered state, the central cable unit does not need any additional parts for safe transport, as required in the delivery specification of conventional coil spring systems. FIGS. 4, 6 and 7 show the transport position, in which the two tubes 30, 31 are totally extended in the axial direction and fixed to one another, also in the circumferential direction; whereas FIG. 5 shows an installation position, in which the tubes 30, 31 are somewhat telescoped in the axial direction and, as a result, are unlocked from one another in the axial direction and in the circumferential direction and can be slid in relation to each other. In operation, when the steering column is adjusted in the axial direction, the central cable unit can now be telescoped. In the event of a crash, the central cable unit telescopes in the same way.

The disassembly of the central cable unit is performed in that the tube 31 is pulled out of the steering column on the steering wheel side in the axial direction. The resulting automatic locking between the tube 30 and the tube 31 has to be designed in terms of the generated forces in such a way that it takes place before the vehicle-sided connection of the end module 23 is unlocked. This arrangement ensures that the central cable unit cannot be pulled out without blocking the transport securing mechanism. If the locking between the tube 30 and the tube 31 has taken place, then the transport securing mechanism is once again present; and the central cable unit can also be pulled out of the vehicle-sided fixing on the end module 23.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A steering device for a motor vehicle equipped with a steering wheel connected in a rotationally rigid manner to a steering shaft that is hollow from end-to-end, comprising:
   an electrical conductor operatively configured to extend from end-to-end through the hollow steering shaft, one end of the electrical conductor being operatively configured to make an electrical connection with equipment on a steering wheel side of the steering shaft,
   a protective device surrounding the electrical conductor, the protective device comprising two protective tubes; and
   wherein a length of the protective device and a length of the electrical conductor are axially variable by movement of the two protective tubes.

2. The steering device according to claim 1, wherein the two protective tubes comprise an outer and an inner tube, the outer and the inner tubes being slidable axially with respect to one another in a telescoping manner.

3. The steering device according to claim 2, wherein the outer and the inner tubes are securable to one another in axial and circumferential directions.

4. The steering device according to claim 3, wherein the two tubes are secured to one another in the axial and the circumferential direction in an axially totally extended position of the two tubes relative to one another.

5. The steering device according to claim 3, wherein the two tubes are securable to one another in at least one of a friction locking and positive locking manner.

6. The steering device according to claim 3, wherein the two tubes are securable to one another via a bayonet lock.

7. The steering device according to claim 3, wherein the two tubes are secured to one another in the circumferential and axial directions via axially directed circumferential grooves and/or a snap cam on the inner tube that interacts with a latching nose on the outer tube.

8. The steering device according to claim 5, wherein the at least one of the friction lock and positive lock connection of the inner and outer tubes is manually releasable at least from an end of the protective device on the steering wheel side.

9. The steering device according to claim 1, further comprising:
   an end module configured at an end of the protective device facing away from the steering wheel; and
   wherein the electrical conductor is fixed in an axial and a radial direction via the end module, the end module being securable against rotation of the steering shaft.

10. The steering device according to claim 9, further comprising:
    an additional end module configured at an end of the protective device facing the steering wheel; and
    wherein the electrical conductor is fixed in an axial and a radial direction via the additional end module, the additional end module being rotatable with the steering shaft.

11. The steering device according to claim 10, further comprising:
    an electrical connector fastened to the end of the electrical conductor that faces away from the steering wheel; and
    wherein the electrical connector is operatively configured to be fixed at least in an axial direction in the end module such that an electrical coupling is automatically made with a corresponding electrical connector arranged on the vehicle during installation of the end module.

12. The steering device according to claim 10, wherein a length of the electrical conductor between the end module and the additional end module is greater than a distance between the end module and the additional end module.

13. The steering device according to claim 1, wherein the electrical conductor comprises a plurality of electrical conductors accommodated on a conductor carrier so as to be electrically insulated from one another.

14. The steering device according to claim 1, further comprising:
a steering gearbox of the vehicle; and
wherein the steering device does not have a mechanical drive connection between the steering wheel and the steering gearbox.

15. The steering device according to claim 14, further comprising:
an actuator operatively configured to drive the steering gearbox; and
wherein the actuator is actuated via output signals produced as a function of actuation of the steering wheel.

16. The steering device according to claim 15, further comprising:
a hydraulic actuating unit operatively coupled with the steering gearbox;
a hydraulic feed unit that acts upon the hydraulic actuating unit and is controlled via the steering wheel; and
wherein the hydraulic actuating unit and the hydraulic feed unit form a default steering device in an event of a malfunction of the actuator in order to control steering via a hydraulic connection between the hydraulic feed unit and the hydraulic actuating unit.

17. The steering device according to claim 10, wherein the end module, the additional end module, the protective device, and the electrical conductor are configured as a preassembled unit.

18. The steering device according to claim 17, wherein the preassembled unit has the inner and outer tubes of the protective device secured relative to one another in a circumferential direction such that a position of the end module relative to the additional end module is fixed in a central position based on a capacity of the electrical conductor to twist in both directions from the central position, which central position corresponds to a straight ahead driving position of the steering wheel.

19. A method for assembling a steering device in a motor vehicle in order to make an electrical connection for electrical equipment on a steering wheel side of the steering device, the motor vehicle being equipped with a hollow steering shaft through which at least one electrical conductor is guided, the method comprising the acts of:
preassembling a steering wheel unit comprising an end module, an additional end module, the electrical conductor having electrical connectors at each end, and a protective device connecting the end module and the additional end module, which protective device comprises two tubes slidable inside one another in an axially telescoping manner and being securable to one another via an anti-rotation and anti-displacement securing device;
inserting the pre-assembled steering wheel unit with the tubes secured to one another in an axial direction into the hollow steering shaft until the end module is placed such that it is permanently attachable to the vehicle via a positive lock;
releasing the anti-rotation and anti-displacement securing device between the two tubes of the protective device;
sliding, in a telescopic manner, the two tubes of the protective device up to a stop on a steering wheel bottom and securing the additional end module such that it is fixed on the steering wheel; and
electrically contacting the electrical connectors of the electrical conductor with corresponding contact terminals.

20. The method according to claim 19, wherein corresponding electrical connectors that are secured on the vehicle are aligned with the electrical connectors on the end module of the pre-assembled unit such that an electrical coupling is made automatically when the positive lock of the end module to the vehicle is produced.

* * * * *